Figure 4:
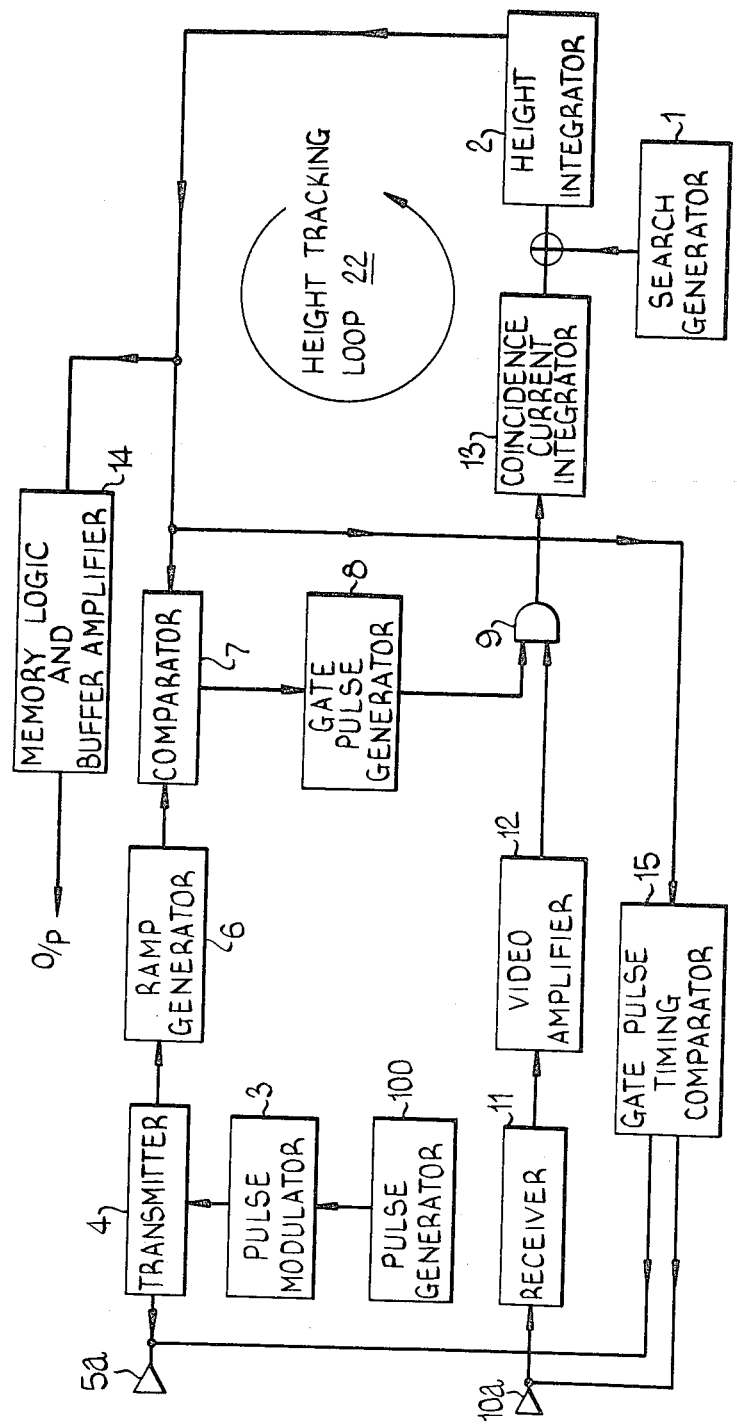

United States Patent [19]

Watson

[11] 4,241,346

[45] Dec. 23, 1980

[54] PULSE RADAR ALTIMETERS

[75] Inventor: George C. Watson, Salisbury, England

[73] Assignee: The Secretary of State for Defence in Her Britannic Majesty's Government of the United Kingdom of Great Britain and Northern Ireland, London, England

[21] Appl. No.: 56,678

[22] Filed: Jul. 11, 1979

[51] Int. Cl.³ .............................................. G01S 13/12
[52] U.S. Cl. ................................. 343/7 A; 343/5 SW; 343/7.5
[58] Field of Search ..................... 343/7.5, 5 SW, 7 A; 244/160

[56] References Cited

U.S. PATENT DOCUMENTS

| 2,959,376 | 11/1960 | Saurma | 244/160 |
| 3,472,471 | 10/1969 | Badewitz | 343/7 A |
| 3,540,045 | 11/1970 | Taylor | 343/7.5 |
| 3,906,495 | 9/1975 | Roger | 343/7 A |

Primary Examiner—Malcolm F. Hubler
Attorney, Agent, or Firm—Pollock, Vande Sande and Priddy

[57] ABSTRACT

The invention relates to pulse radar altimeters for aircraft wherein the altimeter includes a variable beam width receiver antenna for receiving radar ground echoes, a timer for measuring time intervals between transmitted pulses and received ground echoes thereof, and control means responsive to the output of the timer and arranged to vary the beam width of the antenna in accordance with the values of the measured time intervals.

6 Claims, 4 Drawing Figures

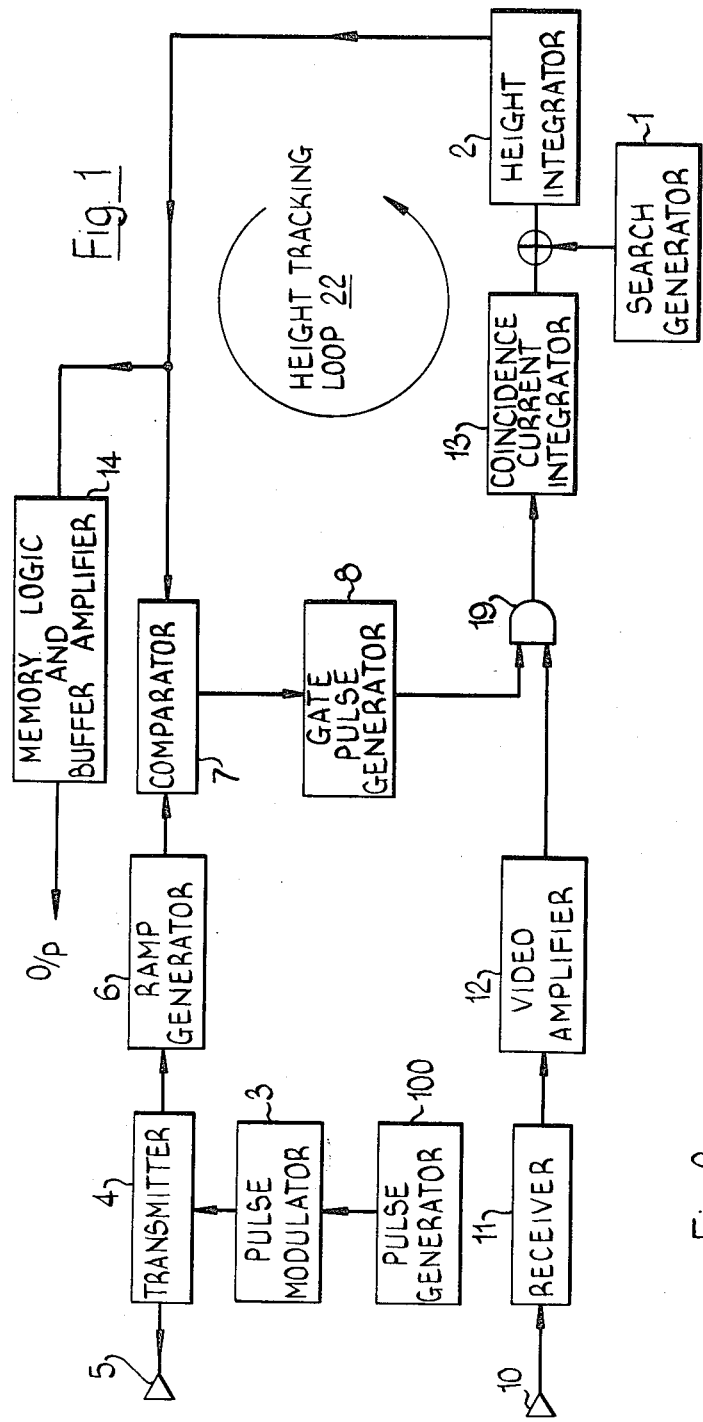
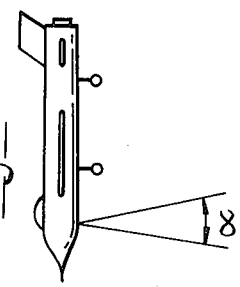

PULSE RADAR ALTIMETERS

The present invention relates to pulse radar altimeters for aircraft including helicopters and missiles.

One form of known pulse radar altimeter suffers from a number of disadvantages particularly during operation at low altitude ie below about 80 ft. In some aircraft installations, the altimeter falsely indicates a sudden decrease in altitude during a normal landing approach at about 70 ft above ground level. The false indication of altitude arises from the reception of radar signals transmitted from the altimeter and which have been reflected from for example undercarriages, stores or airframe structures. This disadvantage is particularly serious where the radar signals are required to be transmitted over a wide cone angle. A further disadvantage, which is apparent in radar altimeters installed in helicopters and other aircraft capable of hovering, is that during hovering at low altitudes of about 90 ft and below, return signals include an interference pattern of nodes and antinodes which result in deep and protracted signal fade. In a known aircraft altimeter where the signal gain of the altimeter receiver is fixed at a low level to prevent locking onto radar signals which have been reflected from parts of the aircraft, the production of such an interference pattern results in excessive noise in the altimeter output and relatively transient, large errors in indicated altitude.

According to the present invention a pulse radar altimeter for an aircraft includes a variable beam width receiver antenna for receiving radar ground echoes, a timer for measuring time intervals between transmitted pulses and received ground echoes thereof, the intervals being proportional to search altitude of the aircraft, and control means responsive to the output of the timer and arranged to vary the beam width of the antenna in accordance with the values of the measured time intervals.

Preferably the timer is arranged to measure said time intervals with respect to the leading edges of the transmitted pulses and the received echoes thereof.

The altimeter may also include a variable beam width receiver antenna which is also connected to said timer and arranged to vary its beam width in accordance with said measured intervals in phase with said transmitter antenna.

The invention will now be described by reference to the accompanying drawings wherein:

FIG. 1 is a block diagram of a known radar altimeter;
FIGS. 2 and 3 illustrate variations in beam angle; and
FIG. 4 is a block diagram of the altimeter of the present invention which effects the beam width variations shown in FIGS. 2 and 3.

FIG. 1 shows a known pulse radar altimeter which employs leading-edge tracking. The altimeter includes a transmitter 4 which receives RF pulses having a prf of 10 kHz and a pulse width of 35 ns from a pulse generator 100 via a pulse modulator 3. The transmitter 4 feeds the RF pulses to a transmitting antenna 5. When, in an ascent, an altitude of 1000′ is reached the pulse width is automatically increased and peak power is increased.

The transmitter 4 also feeds a train of time-zero pulses, To, to a ramp generator 6 which produces a first signal having a linear, positive-going, saw-tooth waveform of 10,000 ns duration synchronized to the transmitter pulse. The first signal is fed to one input of a comparator 7. The other input of the comparator 7 receives a second signal having a positive-going, saw-tooth waveform and a frequency of about 10 Hz from a search generator 1 via a height integrator 2. The comparator detects when the voltage of the first signal reaches that of the second signal and in response triggers a gate pulse generator 8 which then produces a 200 ns pulse which is fed to one input of a twin input gate 19. The other input of the gate 19 receives unipolar video pulses via a video amplifier 2 from a homodyne receiver 11 which has its input connected to a receiving antenna 10 for receiving ground reflected RF pulses. Thus the gate 19 receives a first signal comprising a series of pulses locked on to the transmitter pulses but sweeping out in time every tenth of a second with a varying delay on the transmitter pulse which corresponds to a radar range of 0–5000 ft, and a second signal corresponding to received ground return signals. The comparator 7, the pulse generator 8, the gate 9, a coincidence current integrator 13 and the height integrator 2 form a height tracking loop 22. When during the sweep of the height integrator 2 pulses of the first signal are coincident with pulses of the second signal an output signal is produced which is proportional to the duration of coincidence. The output signal is fed to a coincidence current integrator 13 which has an output signal which opposes the signal from the search generator 1 and prevents the height integrator 2 from repetitively sweeping and so causing the height tracking loop 22 to close, establishing locking, with the trailing edges of the pulses from the gate 9 being held in overlap with the leading edge of the ground return signal pulses. A combined memory logic device and buffer amplifier 14 detects the establishment of locking and derives an analogue height output from the output from the height integrator 2.

Where a wide beam transmitter aerial is used in the above described altimeter, such as indicated generally in FIG. 3, signal returns from undercarriage components are received by the aerial 10. At low altitudes of about 70 to 80 feet, the leading-edge of the pulses from the gate 9 come into coincidence at first with the trailing edges and then the leading-edges of the returns from the undercarriage and lock is then established and a near zero reading of altitude is indicated.

FIG. 4 shows an altimeter in accordance with the invention with the parts which are identical or closely similar to those shown in FIG. 1 indicated with the same reference numerals (except that gate 19 of FIG. 1 is gate 9 of FIG. 4). A gate pulse timing comparator 15 is connected to the output of the height integrator 2 and is arranged to produce an output which changes when the gate pulse time falls below a predetermined value, which corresponds to a search altitude of 70 feet. The predetermined value of gate pulse time is chosen to be greater than the maximum expected interval between time zero and the reception of the trailing edge of a return signal from the undercarriage on other parts of the aircraft which might be expected to give return signals. The output from the comparator 15 timer is fed to and controls the beam width of transmitting and receiving antennas, 5a and 10a, which comprise multi-slot arrays controlled by pin diodes. The beam widths of the antennas are maintained at a wide angle at search altitudes of greater than 70 feet as shown in FIG. 2 and are switched by the output from gate pulse timer 15 to a narrow angle for search altitudes below 70 feet as shown in FIG. 2. The narrow angle beam is sufficiently narrow to ensure that no reflections from the aircraft under-carriage on other parts of the aircraft adjacent to the antennas can occur. The wide angle beam is sufficiently wide to ensure a reliable indicated altitude at high bank angles of the aircraft at higher altitudes where this may be required.

In order to simplify the aircraft wiring the logic level passed to the aerials may be duplexed in the same conductors as those carrying RF feeds.

I claim:

1. An aircraft radar altimeter comprising,
   a transmitter for transmitting radar pulses,
   a variable beam width antenna for radiating the output of the transmitter towards the ground,
   a receiver for receiving radar ground echoes,
   a timer connected to receive inputs from said transmitter and receiver for measuring time intervals between the transmission of each said pulse and the reception of a corresponding ground echo signal the intervals being proportional to search altitude of said aircraft,
   and control means responsive to output of said timer and arranged to vary the beam width of the antenna in accordance with the values of the measured time intervals.

2. An aircraft radar altimeter as in claim 1 wherein said control means is arranged to vary the beam width of the antenna between a low and a high value whenever said timer output reaches a predetermined value, the low value of beam width corresponding to a timer output below said predetermined value.

3. A pulse radar altimeter as in claim 1 or claim 2 wherein said transmitter antenna is a diode controlled multi-slot array antenna.

4. An aircraft radar altimeter comprising,
   a transmitter for transmitting radar pulses,
   a variable beam width transmitter antenna for radiating the output of the transmitter towards the ground,
   a variable beam width receiver antenna for receiving radar ground echoes,
   a receiver connected to receive signals from said receiver antenna,
   a timer connected to receive inputs from said transmitter and receiver for measuring time intervals between the transmission of each said pulse and the reception of a corresponding ground echo signal, the intervals being proportional to search altitude of said aircraft,
   and control means responsive to output of said timer and arranged to simultaneously vary the beam widths of the antennas in accordance with the values of the measured time intervals.

5. An aircraft radar altimeter as in claim 4 wherein the control means is arranged to vary the beam widths of both antennas between a low and a high value whenever said timer output reaches a predetermined value, the low value of beam widths corresponding to a timer output below said predetermined value.

6. A pulse radar altimeter as in claim 4 or claim 5 wherein both said antennas are diode controlled multi-slot array antennas.

* * * * *